United States Patent
Niebling et al.

(10) Patent No.: US 7,896,555 B2
(45) Date of Patent: Mar. 1, 2011

(54) WHEEL BEARING UNIT

(75) Inventors: Peter Niebling, Bad Kissingen (DE);
Ernst Masur, Grettstadt (DE);
Gottfried Ruoff, Oberwerrn (DE)

(73) Assignee: Schaeffler KG, Herzogenaurach (DE)

( * ) Notice: Subject to any disclaimer, the term of this patent is extended or adjusted under 35 U.S.C. 154(b) by 490 days.

(21) Appl. No.: 11/997,596

(22) PCT Filed: Aug. 2, 2006

(86) PCT No.: PCT/DE2006/001344
§ 371 (c)(1),
(2), (4) Date: Feb. 27, 2008

(87) PCT Pub. No.: WO2007/014554
PCT Pub. Date: Feb. 8, 2007

(65) Prior Publication Data
US 2008/0310785 A1    Dec. 18, 2008

(30) Foreign Application Priority Data
Aug. 4, 2005  (DE) .......................... 10 2005 036 674

(51) Int. Cl.
*F16C 19/08*    (2006.01)

(52) U.S. Cl. ........................................ 384/544

(58) Field of Classification Search ................... 384/544, 384/589
See application file for complete search history.

(56) References Cited

U.S. PATENT DOCUMENTS

| | | | |
|---|---|---|---|
| 2006/0120650 A1* | 6/2006 | Niebling et al. | 384/544 |
| 2008/0226213 A1* | 9/2008 | Niebling et al. | 384/512 |

FOREIGN PATENT DOCUMENTS

| | | |
|---|---|---|
| DE | 2329554 X | 1/1975 |
| DE | 10054421 X | 5/2002 |
| DE | 10129709 X | 1/2003 |
| DE | 202004020400 X | 6/2005 |

* cited by examiner

*Primary Examiner* — Thomas R Hannon
(74) *Attorney, Agent, or Firm* — Lucas & Mercanti, LLP

(57) ABSTRACT

A wheel bearing unit which has at least one outer part, at least one inner part and at least two rows of rolling bodies between the outer part and the inner part. One inner raceway is formed on the outer part and one outer raceway is formed on the inner part for the rolling bodies of each row. The wheel hub has internal toothing, which projects radially inwards in the direction of the rotational axis, for engaging external toothing on a drive pin. The internal toothing of the hub is rotationally fixedly coupled to the outer raceway. The ratio of the diameter $d_z$ of a tip circle of the internal toothing to the bearing width $b_L$ of the outer part is greater than 0.9.

11 Claims, 1 Drawing Sheet

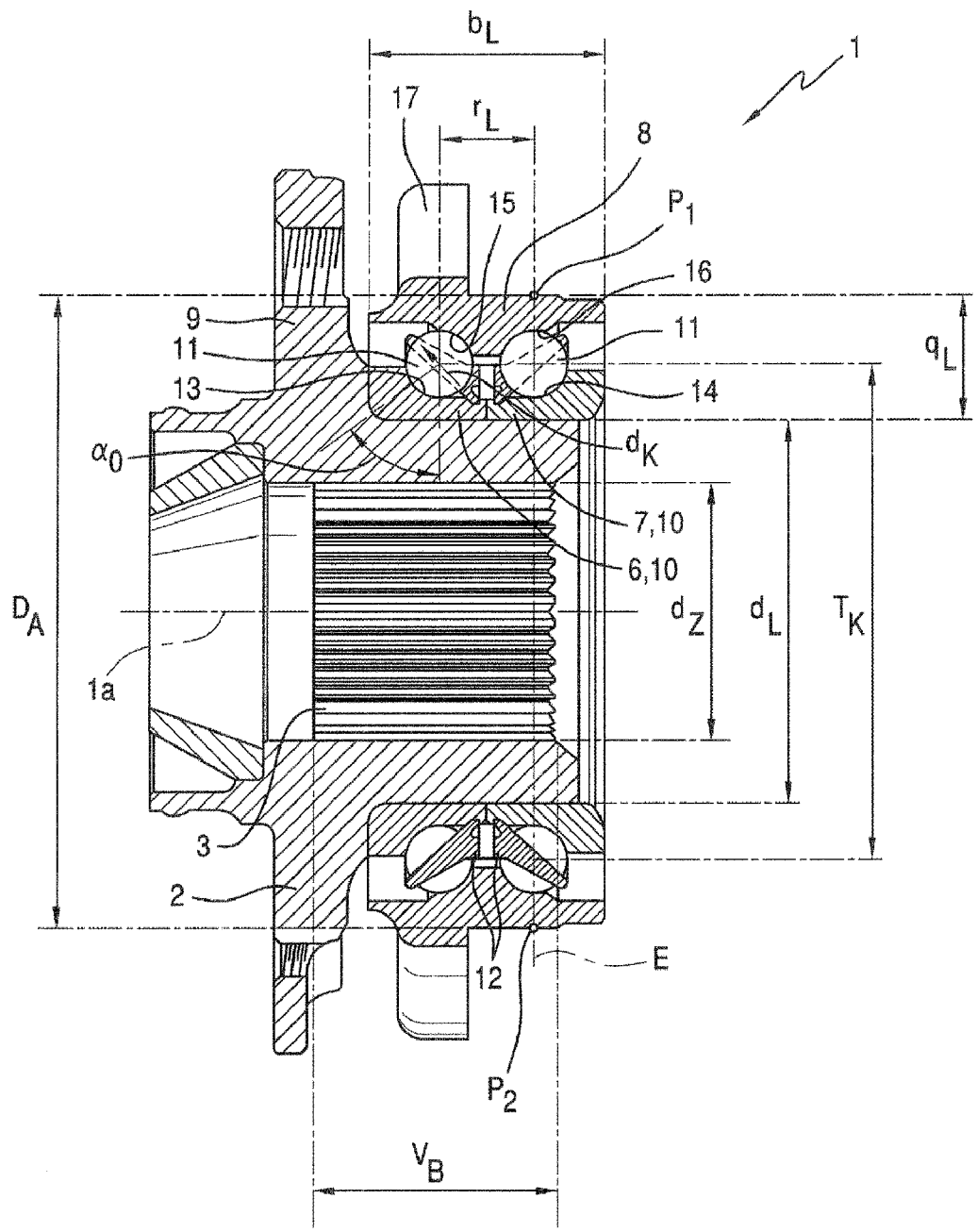

WHEEL BEARING UNIT

FIELD OF THE INVENTION

The invention relates to a wheelbearing unit with at least one outer part, at least one inner part and at least two rows of rolling bodies between the outer part and the inner part, there being formed on the outer part in each case at least one inner raceway and on the inner part in each case at least one outer raceway for the rolling bodies of a row.

BACKGROUND OF THE INVENTION

Known wheelbearing units have a relatively high weight and relatively low bearing rigidity. The bearing rigidity is in this case the resistance which the unit applies against elastic deflections caused by loads. The bearing rigidity results in a tilt resistance which arises from the ratio of moments from loads to the tilt angle in the bearing, for example in Nm/°.

The tilt resistance is the lower, the more the bearing is tilted under loads, that is to say the greater the tilt angle is under the same load. Loads are those loads which essentially act, in the operating state of a vehicle, on a vehicle wheel and on the associated wheel suspension.

The lower the bearing rigidity, the more the loads cause tilts of the wheel system, which have an adverse effect on the driving behavior of the vehicle, in particular when driving around bends, and, via a high axial brake disk deflection, particularly in the region of the brake disks, also have an adverse effect on the wear of the brake and the functioning of the brake.

SUMMARY OF THE INVENTION

The object of the invention, therefore, is to provide a wheelbearing unit with high bearing rigidity.

This object is achieved by means of the wheel bearing unit having the features according to the independent claim.

The wheelbearing unit (1) has at least one outer part (8), at least one inner part (10) and at least two rows of rolling bodies (11) between the outer part (8) and the inner part, there being formed on the outer part (8) in each case at least one inner raceway (15, 16) and on the inner part (10) in each case at least one outer raceway (13, 14) for the rolling bodies (11) of a row.

Furthermore, the wheelbearing unit has a wheel hub which itself has, particularly in the case of driven axles/wheels or particularly for driven axles/wheels, an internal toothing projecting radially inward in the direction of the axis of rotation.

The internal toothing is provided for engagement into an external toothing of a drive journal or the like.

The wheel hub is fixedly at least coupled in terms of rotation to the outer raceway, that is to say, for example, either the wheel hub is the inner part itself and then has at least one of the raceways or at least one inner ring is seated as an inner part on the wheel hub.

The wheelbearing unit according to the invention is characterized in that the ratio of the diameter $d_z$ of a tip circle of the internal toothing to the bearing width $b_L$ of the outer part to be higher than 0.9, that is to say $$d_z/b_L > 0.9$$

with the following explanatory boundary conditions which do not restrict the subject of the invention:

the axial bearing width of the outer part is formed by the greatest spacing, codirectional with the axis of rotation and parallel to the axis of rotation, between the two points of the outer contour of the outer part which are furthest away from one another in the same direction, points being formed preferably on the end faces of the outer ring which face away from one another and are of mostly annular design.

The axial bearing width of the outer part may be greater than or smaller than that of the inner part.

The reference circle of a row of rolling bodies of the wheelbearing unit is the imaginary circle, the center point of which is pierced perpendicularly by the axis of rotation of the wheelbearing unit and which circumferentially intersects or connects to one another the centers of the rolling bodies of the row.

The inner part is at least one inner ring with at least one of the raceways and optionally is two inner rings in one unit with a hub or the like, on which the inner ring is seated, or the inner part is a hub or the like, on which at least one of the raceways is formed directly, and therefore without an inner ring being interposed.

The outer part is at least one outer ring which is mounted to form a unit with an outer housing. The outer housing is, for example, a wheel carrier which has fastening elements for attachment to a vehicle, or the outer part is the outer housing and has at least one of the raceways and is therefore formed, without an outer ring being interposed.

heels, the wheel hubs of which have no internal toothing, according to the invention a corresponding inside diameter of the wheel hub is to be set for the ratio, instead of the diameter d, of the tip circle of the internal toothing.

In each case, preferred, advantageous and nontrivial developments of the subject of the invention according to the independent claim may be gathered from the dependent claims.

Thus, in a development, there may be provision for the ratio of the diameter $T_K$ of the reference circle of a row of rolling bodies of the wheelbearing unit to the diameter $d_K$ of the rolling bodies to be higher than the numerical value 6, in short 6, and for a row spacing $r_L$ between two axially mutually adjacent rows of the rolling bodies (that is to say, the axial center distance from the center of rolling bodies of one row to the center of rolling bodies of the adjacent row) to correspond at most to 1.65 times the diameter $d_K$ of the rolling bodies.

Thus:

$$T_K > 6 \cdot d_K$$

$$r_L \leq 1.65 \cdot d_K$$

with the following, non-restrictive, explanatory boundary conditions:

In wheelbearing units in which the diameters of the reference circles differ from one another from row to row, the ratio applies to the row having the smallest reference circle diameter.

For wheelbearing units in which the diameters of the reference circles are identical from row to row, but the diameters of the rolling bodies differ from one another from row to row, the ratio applies to the row, the rolling bodies of which have the largest diameter.

The ratio applies to wheelbearing units for the mounting of nondriven or driven wheels. Driven wheels are, for example, coupled to the joint outer part of a homokinetic joint, such as steered wheels on vehicles with front-wheel drive or driven wheels on rear-axial structures.

The ratio applies to a single-row, in particular two-row and multirow, ball or rolling bearings, in particular to ball-bearings, of which, as a rule, the inner part is connected to the vehicle wheel and the outer part is fixed on the vehicle side via wheel carriers or stub axles.

The choice of the ratio and of the row spacing departs from the opinion, prevailing among specialists, that the selected dimensions of wheelbearing units must be as small as possible.

Owing to the larger rolling body reference circle, with the static load-bearing coefficient $C_o$ being the same, this results, as compared with a bearing of the prior art, from $$C_0 = f_0 \cdot i \cdot z \cdot d_K^2 \cdot \cos \alpha_0$$

in a larger number of balls per row of the bearing according to the invention, particularly when the selected ball diameter $d_K$ is as small as possible.

$f_O$=factor dependent on the bearing type
i=number of rows of rolling bodies
$\alpha_O$=bearing pressure angle
z=number of rolling bodies.

The rigidity is dependent on factors, such as the modulus of elasticity of the rolling bearing material, on the osculation of the raceway and, to a high degree, on the number of rolling bodies and also the diameter of the rolling bodies.

Thus, for example, for a bearing with a diameter of the reference circle of $T_K$=64 to 65 mm and for z=14 rolling bodies with $d_K$=12.7 mm, a lower rigidity is obtained in a bearing according to the prior art than an advantageously higher rigidity which is obtained for the wheelbearing unit according to the invention with the same reference circle diameter and for z=21 with $d_K$=11.112 mm.

The bearing rigidity, which is increased markedly by virtue of the invention or developments thereof by approximately 40% in comparison with the prior art, leads to an increased bearing tilt resistance. The increased bearing tilt resistance leads to lower load-dependent deformations on the wheelbearing unit and therefore to lower deformations on the brake disks.

Furthermore, in a development, there may be provision for the axial bearing width $b_L$ of the outer part to correspond at most to four times the diameter of the smallest load-bearing rolling body of the wheelbearing unit. Hence, $$b_L \leq 4 \cdot d_K$$

with the following boundary conditions:
the axial bearing width of the outer part is formed by the greatest spacing, codirectional with the axis of rotation and parallel to the axis of rotation, between the two points of the outer contour of the outer part which are furthest away from one another in the same direction, points preferably being formed on the end faces of the outer ring which face away from one another and are mostly of annular design.

The axial bearing width of the outer part may be greater than or smaller than that of the inner part.

Finally, in one refinement of the invention, there is provision for the bearing cross section $q_L$ to correspond at most to twice the diameter of the smallest rolling bodies of the wheelbearing unit. Hence:

$$q_L \leq 2 d_K$$

with the following boundary conditions:
the bearing cross section is determined by the radial spacing between the bearing bore, described by the inside diameter $d_L$ (free inside diameter of the inner part) and by the diameter $D_A$ of the outer part (bearing outside diameter) or, in the case of a nonrotationally symmetrical outer part, by the smallest radial spacing $D_A$ of two points $P_1$ and $P_2$ of the outer contour of the outer part which lie opposite one another on the axis of rotation, and arises from $$2 q_L = D_A - d_L$$

The points $P_1$ and $P_2$ in this case lie in a common radial plane E running through the centers of the rolling bodies of one of the rows. The radial plane E runs through the row in which the smallest radial spacing $D_A$ is formed. In the example according to FIG. 2, this is the row on the right in the drawing for the wheelbearing unit 1 according to FIG. 2.

According to further refinements of the invention,
the ratio of inner ring seat diameter $d_L$ to bearing width $b_L$ is higher than 1.25, that is to say $$d_L/b_L > 1.25,$$

the ratio of inner ring seat diameter $d_L$ to diameter of the rolling bodies $d_K$ is higher than 4.2, that is to say $$d_L/d_K > 4.2,$$

the ratio of inner ring seat diameter $d_L$ to row spacing of the rolling body rows $r_L$ is higher than 3, that is to say $$d_L/r_L > 3,$$

the ratio of inner ring seat diameter $d_L$ to bearing cross section $q_L$ is higher than 2.2, that is to say $$d_L/q_L > 2.2,$$

the ratio of toothing diameter $d_Z$ to row spacing of the rolling body rows $r_L$ is higher than 2.3, that is to say $$d_Z/r_L > 2.3,$$

the ratio of toothing diameter $d_Z$ to rolling body diameter $d_K$ is higher than 3.2, that is to say $$d_Z/d_K > 3.2,$$

the ratio of toothing diameter $d_Z$ to toothing width $V_B$ is higher than 0.9, that is to say $$d_Z/V_B > 0.9,$$

the ratio of bearing outside diameter $D_A$ to toothing diameter $d_Z$ is lower than 2.7, that is to say $$D_A/d_Z < 2.7.$$

Table 1 shows exemplary dimensioning of a wheelbearing unit with (geometric) ratios, given as general minimum or maximum ratios, which, up to the time when the invention was made, are not implemented on wheelbearing units of the prior art and which are fulfilled by the exemplary dimensioning.

TABLE 1

| Bearing Bore Ø $d_L$ [mm] | Toothing Ø $d_Z$ [mm] | Ball Ø $d_K$ [mm] | Bearing Width $b_L$ [mm] | Row Spacing $r_L$ [mm] | Bearing Cross Section $q_L$ [mm] | Bearing Reference Circle Ø $T_K$ [mm] |
|---|---|---|---|---|---|---|
| 62 | 42 | 11.112 | 40.45 | 16 | 20 | 80.4 |

| Ratio | | | | | | | |
|---|---|---|---|---|---|---|---|
| $d_L/b_L$ | $d_L/d_K$ | $d_L/r_L$ | $d_L/q_L$ | $d_Z/r_L$ | $d_Z/d_k$ | $d_Z/V_8$ | $D_A/d_Z$ |
| >1.25 | >4.2 | >3 | >2.2 | >2.3 | >3.2 | >0.9 | >2.7 |

BRIEF DESCRIPTION OF THE DRAWING

The present invention will be further understood and appreciated by reading the following description in conjunction with the accompanying drawing, in which:

The FIGURE shows a wheelbearing unit for a driven axle according to an exemplary embodiment of the invention.

DESCRIPTION OF THE DRAWINGS

The FIGURE shows an exemplary embodiment of the invention in which a wheelbearing unit 1 has a wheel hub 2 with an internal toothing 3, specifying the characteristic quantities essential for the invention. The illustration is in a longitudinal section along the axes of rotation 1a of the wheelbearing units 1 and not true to scale.

The internal toothing 3 on the wheel hub 2 is provided for engagement into an external toothing of a drive journal, not illustrated. The wheel hub 2 is mounted rotatably in the outer part 8 and has a flange 9 for fastening a vehicle wheel, not illustrated, and a brake disk. Seated on the wheel hub 2 are the inner parts 10 in the form of inner rings 6 and 7 which in each case have an outer raceway 13 and 14 for the rolling contact, in each case with one row of rolling bodies 11 in the form of balls. The rolling bodies 11 of a row are guided in a cage 12. The outer part 8 replaces as a flange body the conventional outer ring or outer rings and for this purpose has the inner raceways 15 and/or 16 for rolling contact with the rolling bodies 11. The outer part 8 is provided with a flange 17 for the vehicle-side fastening of the wheel bearing unit 1.

The invention claimed is:

1. A wheel bearing unit, comprising:
   at least one outer part;
   at least one inner part; and
   at least two rows of rolling bodies between the outer part and the inner part,
   at least one inner raceway being formed on the outer part and at least one outer raceway being formed on the inner part for the rolling bodies of a row and the wheel hub having an internal toothing, projecting radially inward in the direction of the axis of rotation, for engagement into an external toothing on a drive journal and being fixedly at least coupled in terms of rotation to the outer raceway, wherein
   the ratio of the diameter of a tip circle of the internal toothing to the bearing width of the outer part is greater than 0.9, and
   wherein the ratio of toothing diameter to toothing width is greater than 0.9.

2. The wheel bearing unit according to claim 1, wherein a ratio of the diameter of the reference circle of at least one row of the wheel bearing unit to the diameter of the rolling bodies of the respective row is greater than the numerical value six, the reference circle being an imaginary circle which is concentric to the axis of rotation of the wheel bearing unit and which connects the centers of the rolling bodies of a row circumferentially to one another, and the row spacing between the rows corresponds at most to 1.65 times the diameter of the rolling bodies, the row spacing being the axial spacing, co-directional with the axis of rotation, between the centers of the rolling bodies.

3. The wheel bearing unit according to claim 1, wherein the axial bearing width of the outer part is at most four times the diameter of the smallest rolling bodies of the wheel bearing unit, the axial bearing width being the maximum spacing, co-directional with the axis of rotation, between two outer contour points of the outer part which are furthest away from one another axially.

4. The wheel bearing unit according to claim 1, wherein the bearing cross section corresponds at most to twice the diameter of the smallest rolling bodies of the wheel bearing unit, the bearing cross section being the radial spacing which is directed transversely to the axis of rotation and which arises from a difference of the smallest outer dimension of the outer part and of the free inside diameter of the bearing bore, and the smallest outer dimension being the radial spacing between two points of the outer contour which lie opposite one another on the axis of rotation in an imaginary radial plane running through the centers of the rolling bodies.

5. The wheel bearing unit according to claim 1, wherein the ratio of inner ring seat diameter to bearing width is greater than 1.25.

6. The wheel bearing unit according to claim 1, wherein the ratio of inner ring seat diameter to diameter of the rolling bodies is greater than 4.2.

7. The wheel bearing unit according to claim 1, wherein the ratio of inner ring seat diameter to row spacing of the rolling body rows is greater than 3.

8. The wheel bearing unit according to claim 1, wherein the ratio of inner ring seat diameter to bearing cross section is greater than 2.2.

9. The wheel bearing unit according to claim 1, wherein the ratio of toothing diameter to row spacing of the rolling body rows is greater than 2.3.

10. The wheel bearing unit according to claim 1, wherein the ratio of toothing diameter to rolling body diameter is greater than 3.2.

11. The wheel bearing unit according to claim 1, wherein the ratio of bearing outside diameter to toothing diameter is less than 2.7.

* * * * *